Inventor
William J. Antley,

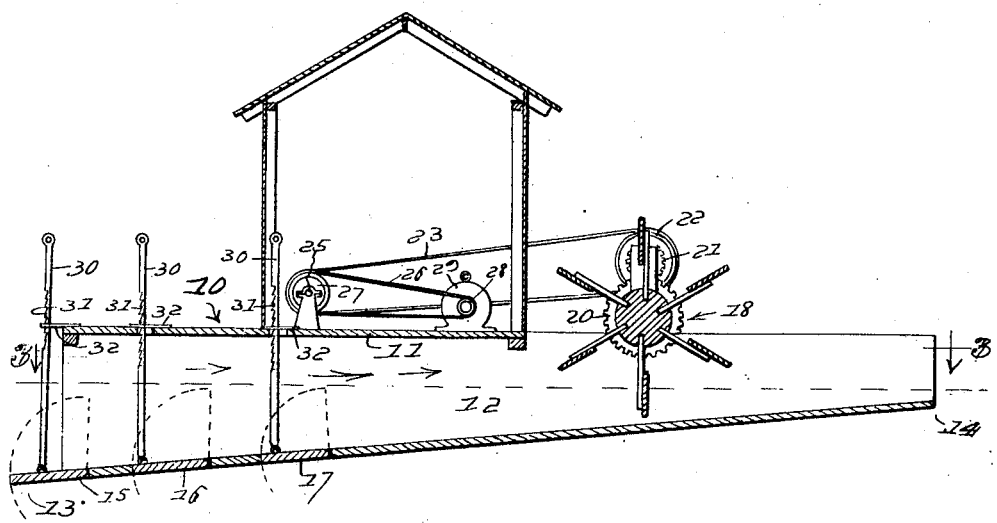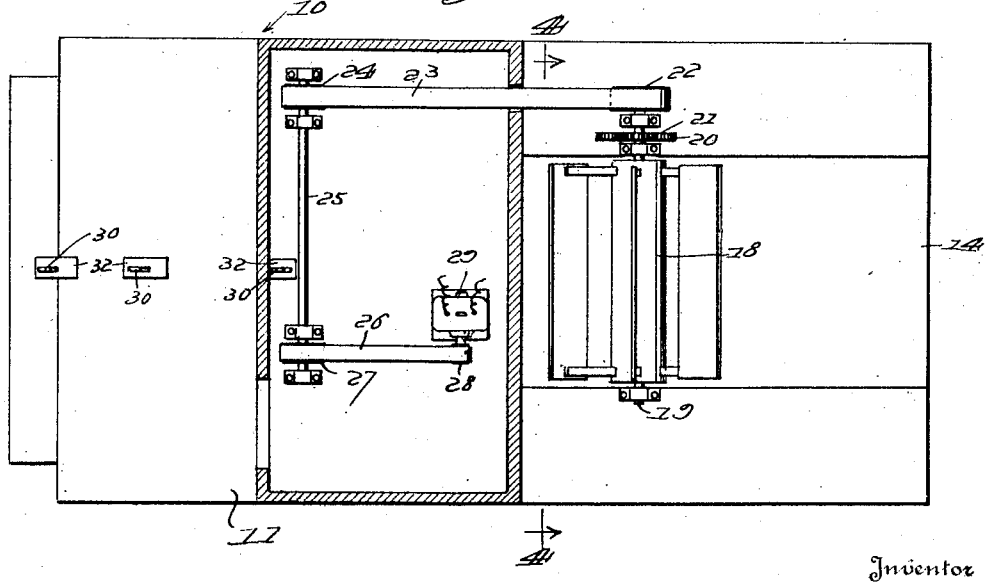

Attorney

UNITED STATES PATENT OFFICE.

WILLIAM J. ANTLEY, OF YONGES ISLAND, SOUTH CAROLINA.

CURRENT-MOTOR.

1,374,801.   Specification of Letters Patent.   Patented Apr. 12, 1921.

Application filed February 12, 1920. Serial No. 358,262.

*To all whom it may concern:*

Be it known that I, WILLIAM J. ANTLEY, a citizen of the United States of America, residing at Yonges Island, in the county of Charleston and State of South Carolina, have invented new and useful Improvements in Current-Motors, of which the following is a specification.

The object of the invention is to provide a simple, inexpensive and efficient means adapted for arrangement in the path of flow of water in a river, stream, brook or the like, for the purpose of utilizing the motion and power due to the flow of the water as a means of generating power for use in driving machinery or for storage or for lighting purposes and the like, and subject to control to adapt the rapidity of the generation of power to suit the rapidity of consumption or to entirely check the same when not required, and with these objects in view the invention consists in a construction and combination of parts of which a preferred embodiment is shown in the accompanying drawings, wherein:

Figure 1 is a sectional view taken longitudinally of the apparatus.

Fig. 2 is a plan view.

Figure 3:
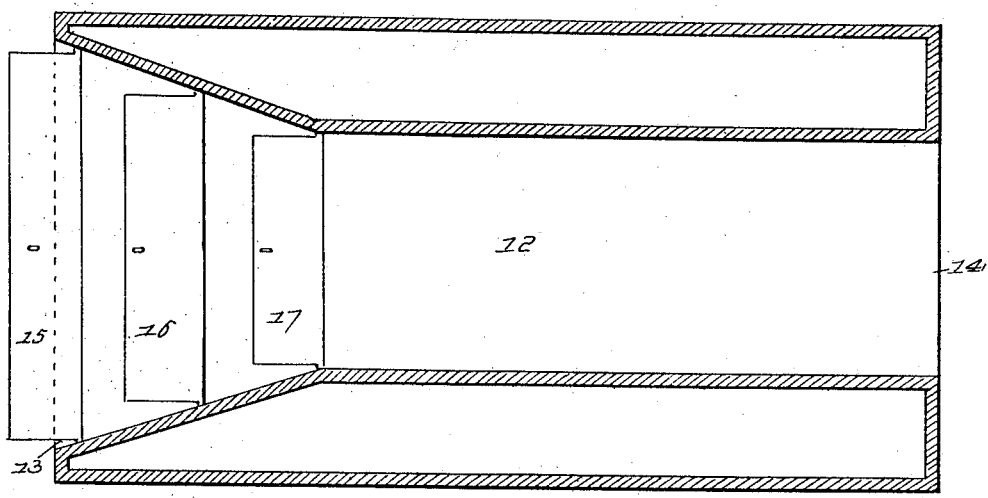
Fig. 3 is a horizontal section on the plane indicated by the line 3—3 of Fig. 1.
Figure 4:
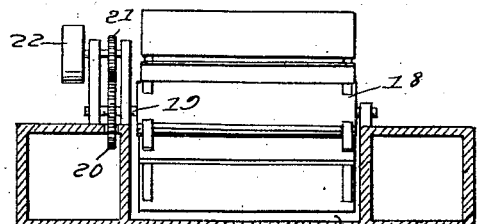
Fig. 4 is a transverse section on the plane indicated by the line 4—4 of Fig. 2.

The device consists essentially of a barge 10 provided beneath the platform 11 with a chute or runway 12 of which the bottom is preferably inclined upward from the inlet end 13 to the outlet end at 14 and is fitted at different elevations with trap doors 15, 16 and 17 designed to normally fit in and close outlet openings in the bottom of the chute or to be raised to an upright or substantially vertical position as indicated in dotted lines in Fig. 1 to form baffles.

When in their normal positions in continuation of the bottom of the chute and closing the openings to which they are fitted, these trap doors serve to direct the flow of water moving in the direction indicated by the arrow in Fig. 1 into contact with the paddles of a water wheel 18 of which the shaft 19 is mounted in suitable bearings on the barge and is connected by intermeshing gears 20 and 21 with a pulley 22 from which extends a belt 23 to a similar pulley 24 on a counter-shaft 25. With this counter-shaft through the agency of a belt 26 and pulleys 27 and 28 or equivalent means of gearing, is connected a dynamo 29 or other power generator from which energy may be conducted to a point of storage or use as may be required.

Obviously when the trap doors or valves which are located near the inlet end of the chute are in their normal or closed positions, the full force of the current, or so much thereof as may be received by the chute is applied to the water wheel, whereas by opening said trap doors or valves the flow through the chute is prevented and water entering the same is permitted to flow out through the openings to which the valves are fitted. When it is desired, however, to modify or reduce the effect upon the water wheel without entirely checking its movement the trap door or valve 15 at the inlet end of the chute may be raised partly or completely by means of an operating rod 30 having a ratchet 31 for engagement with a keeper 32. When the valve is raised to a vertical position as indicated in dotted lines in Fig. 1 its upper edge is still located below the surface of the flow through the chute to the end that there will be a sufficient circulation of water through the latter to cause a relatively slow movement of the water wheel, and this movement may be still further impeded without being entirely stopped by opening the second trap door or valve 16 by means of its operating rod corresponding with that with which the valve 15 is provided, whereas the opening of the third trap door or valve as the parts are constructed and proportioned in the drawing will serve to interrupt the flow through the chute and permit the water wheel to remain at rest when its operation is not necessary. In other words the convertible valves and baffles which are mounted in the chute are of graduated size to the end that the arrangement of one or the other thereof in the baffling position will serve to determine the rapidity of movement of the water through the chute and hence the velocity of the water wheel and of the dynamo or other power generating unit.

What is claimed is:

1. A current motor having a chute provided with an upwardly and forwardly inclined bottom wall, and a water wheel arranged for operation by flow through the chute, said chute being provided in its bottom with a plurality of outlet openings and convertible valves and baffles fitted to said openings and adapted for arrangement in obstructing relation to the flow of water through the chute.

2. A current motor having a chute provided with an upwardly and forwardly inclined bottom wall, and a water wheel arranged for operation by flow through the chute, said chute being provided in its bottom with a series of outlet openings and graduated convertible valves and baffles fitted to said openings and adapted for arrangement in flow-obstructing relation with the bottom of the chute.

3. A current motor having a chute provided with an upwardly and forwardly inclined bottom wall, and a water wheel arranged for operation by flow through the chute, said chute being provided in its bottom with a series of outlet openings, valves hingedly mounted to close said openings and adapted for arrangement in flow-obstructing relation with the interior of the chute, operating rods connected with said valves and means for locking said rods to secure the said valves in adjusted positions.

In testimony whereof I affix my signature.

WILLIAM J. ANTLEY.